United States Patent Office 2,772,172
Patented Nov. 27, 1956

2,772,172
FILM FOR PACKAGING MEATS

Clarence M. Carson, Cuyahoga Falls, Ohio, assignor, by mesne assignments, to The Goodyear Tire & Rubber Company, a corporation of Ohio No Drawing. Application August 29, 1951,
Serial No. 244,255

7 Claims. (Cl. 99—174)

This invention relates to transparent rubber hydrochloride film which possesses a high oxygen-diffusion rate and is suitable for packaging fresh meats such as beef, lamb, fish and poultry, as distinguished from films of low oxygen-diffusion rate which may be used for packaging processed or cured meats such as cold cuts, boiled or smoked ham, smoked fish, etc. When the film of this invention is used for packaging red meats, its high oxygen-diffusion rate preserves the red color of the meat. The invention includes the new film, the method of wrapping red meat in the film, and red meat wrapped in the film.

The prepackaging of fresh meats for self-service stores and the like has been retarded by the fact that when wrapped in a usual transparent wrapper, red meats such as beef, etc. darken rapidly. Meats which have darkened or otherwise discolored are not attractive and do not lend themselves for display in self-service stores. The film of this invention is so composed that it preserves the red color of so-called red meats for several days when kept under refrigeration, and preserves other fresh meats in a fresh condition for a satisfactory period. For certain meat products preservation for one day is sufficient; for others three or four days are required.

The length of time that a fresh meat must be preserved depends somewhat on the nature of the meat. For instance, ground meats such as hamburger, etc. have a much greater surface exposed to the air than the surface exposed on the same weight of a sliced roast or steak. The butcher realizes this and hamburger is usually ground fresh daily. The wrappers for sliced roasts and steaks, etc. must preserve them in a fresh condition over a week-end or longer.

An explanation of the discoloration of red meats may be as follows. Oxyhemoglobin and methemoglobin are both obtainable from reduced hemoglobin, the former by oxygenation and the latter by oxidation. In oxyhemoglobin the oxygen is loosely held and can be removed by a vacuum pump. The conversion of reduced hemoglobin to oxyhemoglobin is therefore a process of oxygenation and the iron present in the hemoglobin is not oxidized during the process but remains as ferrous iron in the oxyhemoglobin.

Reduced hemoglobin makes the meat which contains it dark red or purple in color due to its content of ferrous iron. This is the color of the center of the meat, and the color of the meat when it is first cut. If the fresh cut is exposed to air the dark red hemoglobin takes up oxygen from the air and forms bright red oxyhemoglobin. The color of each is attractive, and is due, at least largely, to the ferrous iron which is present.

Methemoglobin is an oxidation product. Its iron content is present as ferric iron instead of ferrous iron as in reduced hemoglobin and oxyhemoglobin. It is the conversion of the ferrous iron to ferric iron that causes meat to turn dark brown as the reduced hemoglobin or oxyhemoglobin is oxidized to methemoglobin.

Unrestricted exposure to the atmosphere or oxygen, particularly under pressure, tends to produce oxyhemoglobin from reduced hemoglobin. A wrapper that excludes most of the air hastens the production of methemoglobin and causes the meat to turn dark brown. On the other hand, a wrapper which is of such a composition and thickness as to permit the diffusion of air into the package, keeping an excess present, prevents or retards the formation of methemoglobin.

The high oxygen-transmission rate required to keep red meat red and to keep other fresh meats fresh, is obtainable in rubber hydrochloride film by plasticizing to increase the gas permeability of the film. However, with all meats a low plasticizer content is generally desirable to prevent loss of moisture with consequent dehydration of the meat. The specifications for rubber hydrochloride film for packing red meat or other fresh meat have been determined to be (1) a water-vapor transfer rate (determined by the method adopted by The Technical Committee of The Packaging Institute and published in Modern Packaging, vol. 19, No. 12, page 146, August 1946) between ten and twenty-five grams per one hundred square inches in twenty-four hours and (2) an oxygen-diffusion rate (determined by the method and equipment described in Modern Packaging, vol. 20, No. 2, page 156, October 1946, and since adopted as standard by The Technical Committee of The Packaging Institute) which is at least substantially two hundred cubic centimeters per one hundred square inches in twenty-four hours. Red meats, such as beef steaks and roasts, packaged in such films, maintain their red color and attractive appearance when kept in open refrigerating cabinets at approximately 36° F. for several days. Such films likewise preserve fresh meats in a fresh condition for several days under similar conditions. To maintain the freshness of any fresh meat, whether it be a red meat or not, it is desirable to give the wrapped meat access to the air; the packages are not to be packed against one another so tightly that the air circulation is cut off.

Rubber hydrochloride film which contains 25 to 40 parts of plasticizer per 100 parts of rubber hydrochloride has been found satisfactory for packaging all fresh meats. Suitable plasticizers are the usual ester plasticizers such as butyl stearate and dibutyl sebacate; other alkyl esters of carboxylic acids, for example propyl, butyl, amyl, hexyl, heptyl, octyl, etc.; palmitates, stearates, sebacates, oleates, etc.; phosphates including tributoxyethyl phosphate, etc.; Paraplex G-60 and said to be a polymerized ester. Other plasticizers which may be used in the meat film of this invention include aromatic-base mineral oils, AE1 (of unknown composition), hydrogenated terphenyl (a partially hydrogenated mixture of terphenyls), etc. A minimum of 25 percent of plasticizer is required to give the desired oxygen diffusion; over 40 percent of plasticizer gives high moisture diffusion and the films are too soft to handle. Commercially a mixture of plasticizers is ordinarily used in highly plasticized film to reduce cost and sometimes to prevent the plasticizer from bleeding to the surface of the film.

To prevent the film from fogging by moisture condensing on its surface when the package is placed in refrigeration, the surface of the rubber hydrochloride film may be covered with a hydrophilic material. Because of the high plasticizer content employed the film advantageously has incorporated in it a non-blocking agent, or is dusted or sprayed with such an agent.

The following examples further illustrate the invention. A starch dispersion or the like may be sprayed onto the film as it passes through a drier, but generally it will be preferable to incorporate the anti-blocking agent in the film. One-half to two parts of a fine, light, porous form of silica aerogel are preferred for this purpose. It is advantageously mixed with the plasticizers and added to the rubber hydrochloride dispersion in admixture with them. Although the non-fogging agent may be applied as a coating to one or both surfaces of the film, it is preferably added to the film composition before casting. The preferred non-fogging agents are soluble in the solution of the rubber hydrochloride in benzene, or other solvent used and are added to it, and are less soluble in the rubber hydrochloride so that as the solvent is evaporated they bloom to the surface of the finished film. A preferred non-fogging agent is Carbowax 1500 dilaurate which is said to be polyethylene glycol dilaurate produced from a polyethylene glycol with a molecular weight of about 1500. Monocarboxylic acid esters of polyethylene glycols with a molecular weight of 400 to 4000, as, for example, the mono- and dioleates, the mono- and distearates, and esters of other acids of 12 to 20 carbon atoms can be used satisfactorily. The sorbitan monopalmitate polyoxyalkylene derivative known as Tween 40 has proved satisfactory. Any effective hydrophilic agent may be used in any suitable manner, so long as it is non-toxic and does not interfere with the transparency of the film.

Each of the examples relates to unstretched rubber hydrochloride film produced by casting a benzene solution of the rubber hydrochloride composition described in the respective examples. The film may be from .0005 to .0012 inch thick, and is preferably approximately .0008 inch in thickness. Thicker films are not required for self-service packages and this invention does not include films thicker than .0012 inch. The thicker the film, the greater the plasticizer required to give the necessary oxygen transmission. It is contemplated that the meat will be wrapped in a single ply of the film, with overlapping edges of the film heat-sealed to one another.

*Example 1*

A preferred film has the following composition:

| | Parts |
|---|---|
| Rubber hydrochloride | 100 |
| Dibutyl sebacate | 15 |
| 2-ethylhexyl-diphenyl phosphate | 15 |
| Silica aerogel | 1.0 |
| Polyethylene glycol dilaurate | 2.0 |

A preferred thickness is .0008 inch. Such film has a water-vapor-transmission rate of 15 grams/100 sq. in./24 hours and an oxygen-transmission rate of 620 cc./100 sq. in./24 hours. It has been used satisfactorily in the wrapping of a variety of red meats.

*Example 2*

| | Parts |
|---|---|
| Rubber hydrochloride | 100 |
| Dibutyl sebacate | 20 |
| Methoxyethyl oleate | 20 |
| Silica aerogel | 1.5 |
| Polyethylene glycol dilaurate | 2.5 |

This film had a gauge of .0012 inch. Its water-vapor transfer rate is 20.6 grams/100 sq. in./24 hours. Its oxygen-diffusion rate is 1450 cc./100 sq. in./24 hours. Beefsteaks wrapped in a single ply of this film with the overlapping portions heat-sealed to one another were preserved in a bright red condition for several days in a self-serve, refrigerated, open showcase designed for use in a super-market.

*Example 3*

This film had the following composition:

| | Parts |
|---|---|
| Rubber hydrochloride | 100 |
| Dibutyl sebacate | 15 |
| Methoxyethyl oleate | 15 |
| Silica aerogel | 1.0 |
| Polyethylene glycol dilaurate | 2.0 |

Film of this composition 0.0009 inch thick has a water-vapor transfer rate of 14.5 grams/100 sq. in./24 hours, and an oxygen-diffusion rate of 425 cc./100 sq. in./24 hours.

This film wrapped and heat-sealed over beef, pork, and veal roasts and cutlets protects the meat from discoloration for several days in a refrigerated show-case.

*Example 4*

This film had the following composition:

| | Parts |
|---|---|
| Rubber hydrochloride | 100 |
| Dibutyl sebacate | 10 |
| 2-ethylhexyldiphenyl phosphate | 15 |
| AE1 Plasticizer | 5 |
| Silica aerogel | 1.0 |
| Polyethylene glycol dilaurate | 1.5 |

Film of this composition 0.00085 inch thick has a water-vapor transfer rate of 14.3 grams/100 sq. in./24 hours, and an oxygen-diffusion rate of 350 cc./100 sq. in./24 hours. This film preserved beef round and sirloin steaks and ground beef satisfactorily under refrigeration.

*Example 5*

This film had the following composition:

| | Parts |
|---|---|
| Rubber hydrochloride | 100 |
| Paraplex G-60 | 15 |
| Methoxyethyl oleate | 15 |
| Silica aerogel | 1.0 |
| Polyethylene glycol dilaurate | 1.5 |

Film of this composition 0.00055 inch thick has a water-vapor transfer rate of 20.7 grams/100 sq. in./24 hours, and an oxygen-diffusion rate of 945 cc./100 sq. in./24 hours. Such film preserves sliced beef for several days in a self-serve refrigerator. Trays of ground beef wrapped in this film maintained their color satisfactorily.

*Example 6*

| | Parts |
|---|---|
| Rubber hydrochloride | 100 |
| Methoxyethyl oleate | 15 |
| AE-1 | 15 |
| Polyethylene glycol dilaurate | 1.5 |
| Silica aerogel | 1.0 |

Film of this composition 0.0009 inch thick has a water-vapor transfer rate of 11.0 grams/100 sq. in./24 hours and an oxygen diffusion rate of 315 cc./100 sq. in./24 hours. Round and sirloin tip steaks and ground beef are suitably protected from discoloration under refrigeration when wrapped in such film.

*Example 7*

| | Parts |
|---|---|
| Rubber hydrochloride | 100 |
| Methoxyethyl oleate | 15 |
| Paraplex G-60 | 15 |
| Polyethylene glycol dilaurate | 1.5 |
| Silica aerogel | 1.5 |

Film of this composition 0.0065 inch thick has a water-vapor transfer rate of 11.0 grams/100 sq. in./24 hours and an oxygen diffusion rate of 350 cc./100 sq. in./24 hours. The bright red color of wrapped beef, round steak, sirloin tip steaks and ground beef is preserved under refrigeration for a satisfactory period.

*Example 8*

| | Parts |
|---|---|
| Rubber hydrochloride | 100 |
| Dibutyl sebacate | 13.12 |
| 2-ethylhexyl-diphenyl phosphate | 13.12 |
| Polyethlene glycol dilaurate | 2.0 |
| Silica aerogel | 1.0 |

Film of thickness 0.00085 has water-vapor and oxygen transmission rates of 10.2 grams and 190 cc. respectively per 100 sq. in./24 hours.

The films of this invention make a desirable wrap for luncheon meats which contain a cured meat mixed with materials which cause the meat to rapidly change color. Brains, liver, hearts, kidneys, sweetbreads and other edible animal by-products have been preserved in the film of this invention for a satisfactory period of time. Here the problem is not so much to prevent discoloration but to prevent growth of anaerobic bacteria which cause spoilage with resultant sliming, etc., and to provide a liquid-tight package for the customer's protection. The films can also be used satisfactorily for wrapping ham, bacon, sausage, fish, poultry, chipped beef, cheese, fresh fruits, etc. These films have such a high plasticizer content that they are strong and flexible at relatively low temperatures and can be used satisfactorily for wrapping frozen foods such as poultry, etc.

The invention is not limited to the plasticizers mentioned. A preferred plasticizer is dibutyl sebacate and up to thirty or forty parts may be used per one hundred parts rubber hydrochloride without other plasticizer. Often a lesser amount will be employed together with cheaper plasticizer.

This application is a continuation-in-part of my application Serial No. 180,305 filed August 18, 1950 now abandoned.

What I claim is:

1. The method of preserving the red color of freshly cut red meat due to the red blood therein while preventing formation of methemoglobin therein which comprises wrapping the meat in a single ply of transparent film between .0005 and .0012 inch thick, consisting essentially of 25 to 40 parts of ester plasticizer and 100 parts rubber hydrochloride which is coated on the surface adjacent the meat with a hydrophilic material to prevent fogging, which film has a water-proof transfer rate between ten and twenty five grams, and an oxygen-diffusion rate of at least substantially 200 cubic centimeters.

2. The method of preserving the red color of freshly cut red meat due to the red blood therein while preventing formation of methemoglobin therein which comprises wrapping the meat in a single ply of transparent rubber hydrochloride film .0008 inch thick which is composed of one hundred parts rubber hydrochloride, fifteen parts dibutyl sebacate, fifteen parts 2-ethylhexyl diphenyl phosphate, and two parts polyethylene glycol dilaurate, at least a part of said dilaurate forming a bloom on the surface of the film wrapped adjacent the meat.

3. Freshly cut red meat sealed in a single ply of transparent film, .0005 to .0012 inch thick, consisting essentially of 25 to 40 parts of ester plasticizer and 100 parts rubber hydrochloride, at least the inner surface of which is non-fogging because of the presence thereat of a hydrophilic material, which film contains a non-blocking agent and has a water-vapor transfer rate between ten and twenty-five grams and an oxygen-diffusion rate of at least substantially 200 cubic centimeters.

4. Freshly cut red beef heat-sealed in a single ply of transparent film which is .0005 to .0012 inch thick, which consists essentially of 25 to 40 parts of ester plasticizer and 100 parts of rubber hydrochloride, and has a water-vapor transfer rate of ten to twenty-five grams and an oxygen-diffusion rate of at least substantially 200 cubic centimeters.

5. Transparent rubber hydrochloride film substantially .0008 inch thick which is composed of one hundred parts rubber hydrochloride, fifteen parts dibutyl sebacate, fifteen parts 2-ethylhexyl diphenyl phosphate, one part fine silica aerogel, and two parts polyethylene glycol dilaurate, at least a part of the dilaurate forming a bloom on one surface of the film.

6. Freshly cut red meat wrapped in a single ply of the film of claim 5.

7. Freshly cut red meat wrapped in a single ply of transparent rubber hydrochloride film substantially .0008 inch thick which is composed of one hundred parts rubber hydrochloride and twenty-five to forty parts of ester plasticizer of which at least half is dibutyl sebacate.

References Cited in the file of this patent

UNITED STATES PATENTS

| | | |
|---|---|---|
| 2,071,300 | Gammeter | Feb. 16, 1937 |
| 2,328,844 | Osterhof | Sept. 7, 1943 |
| 2,349,036 | Ferner | May 16, 1944 |
| 2,385,257 | Cavallito | Sept. 18, 1945 |
| 2,561,010 | Carson | July 17, 1951 |
| 2,561,011 | Carson | July 17, 1951 |
| 2,633,456 | Vaughan | Mar. 31, 1953 |

OTHER REFERENCES

"Technical Section," reprinted from October 1943 issue of Modern Packaging Magazine, vol. 17, No. 2, pages 103 to 107, inclusive, article entitled Pliofilm— its properties and future possibilities.